United States Patent [19]
Fritz et al.

[11] Patent Number: 5,466,146
[45] Date of Patent: Nov. 14, 1995

[54] HYDROFORMING PLATEN AND SEAL

[76] Inventors: Michael L. Fritz, 2440 E. Dahlia, Phoenix, Ariz. 85032; Alton L. Fritz, 12121 N. 83rd Ave., Peoria, Ariz. 85345

[21] Appl. No.: 239,258

[22] Filed: May 6, 1994

Related U.S. Application Data

[63] Continuation of Ser. No. 905,766, Jun. 29, 1992, abandoned.

[51] Int. Cl.⁶ .................................................. B29C 59/00
[52] U.S. Cl. .................. 425/389; 264/314; 425/DIG. 19; 425/DIG. 47
[58] Field of Search ............................ 264/314; 425/389, 425/390, 405.1, 417, DIG. 14, DIG. 19, DIG. 47

[56] References Cited

U.S. PATENT DOCUMENTS

| | | | |
|---|---|---|---|
| 1,854,498 | 4/1932 | Anderson | 425/405.1 |
| 3,172,153 | 3/1965 | Loomis et al. | 425/417 |
| 3,535,740 | 10/1970 | Frowde | 425/389 |
| 3,545,241 | 12/1970 | Grankowski et al. | 425/389 |
| 3,956,452 | 5/1976 | Saito | 264/314 |
| 4,080,139 | 3/1978 | Hellgren | 425/389 |
| 4,105,388 | 8/1978 | Hellgren | 425/389 |
| 4,128,375 | 12/1978 | Schubart | 425/389 |
| 4,133,626 | 1/1979 | Schubart | 425/417 |
| 4,588,368 | 5/1986 | Buhler et al. | 425/389 |
| 4,886,442 | 12/1989 | McCowin et al. | 425/405.1 |

FOREIGN PATENT DOCUMENTS

| | | | |
|---|---|---|---|
| 2462984 | 3/1981 | France | 425/417 |
| 2060470 | 5/1981 | United Kingdom | 425/417 |

*Primary Examiner*—C. Scott Bushey
*Attorney, Agent, or Firm*—Cahill, Sutton & Thomas

[57] ABSTRACT

A platen for applying pressure during hydroforming of polycarbonate and similar sheet material includes a flexible diaphragm for applying pressure in response to hydraulic fluid under pressure within a platen cavity and a diaphragm circumscribing sealing member for inhibiting seepage of hydraulic fluid and for preventing outward migration of the material of the diaphragm during a hydroforming operation. The junction between the sealing member and the diaphragm is conforming and void free to prevent hydraulic fluid flow therebetween. To help contain the hydraulic fluid within the platen cavity, a circumscribing inwardly extending foot of the diaphragm provides a mechanical and dynamic seal against an adjacent surface of the platen cavity.

12 Claims, 3 Drawing Sheets

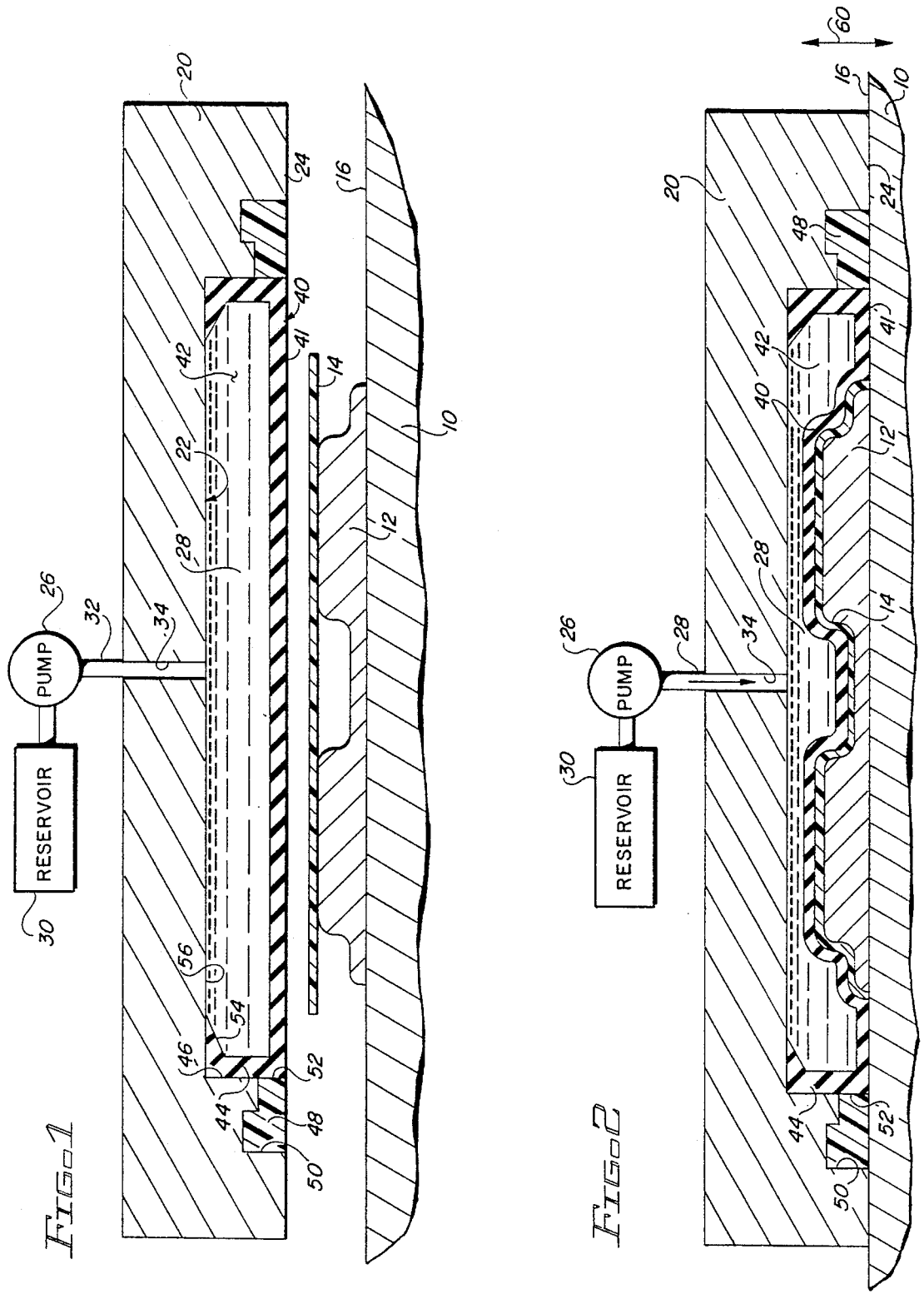

HYDROFORMING PLATEN AND SEAL

This is a continuation of application Ser. No. 07/905,766, filed Jun. 29, 1992, now abandoned.

BACKGROUND OF THE INVENTION

1. Field of the Invention

The present invention relates to platens for hydroforming finished plastic sheet material and, more particularly, to a diaphragm and circumscribing seal of the platen.

2. Description of Related Art

The process of hydroforming has been practiced for many years. It includes the use of a flexible diaphragm disposed in a cavity of a platen for forcing sheet material to conform with the configuration of a mold. Hydraulic fluid, acting upon the diaphragm, causes the diaphragm to force the sheet material disposed intermediate the diaphragm and the mold to conform with the mold. Because substantial pressures, sometimes exceeding 5,000 pounds per square inch, may be present, leakage of hydraulic fluid about the edges of the diaphragm and onto the mold or sheet material to be formed may occur. In hydroforming operations involving a subsequent step in fabricating a product, cleaning is the norm and leakage of hydraulic fluid onto the product molded is of minor concern. When the product molded is to be a finished product, contamination of the product by leaking hydraulic fluid creates a significant problem of requiring an additional cleaning step and possibly compromising the product.

To prevent leakage of hydraulic fluid adjacent the perimeter of the diaphragm and to maintain the pressurized hydraulic fluid within the platen cavity behind the diaphragm, it has been standard practice to place a seal in a channel surrounding the diaphragm. The seal is formed of four rails having angled ends to mate in the manner of a conventional picture frame. The seal is machined with high tolerance to fit the corresponding slots and grooves in a channel about the diaphragm. The machining must be very accurate in order to develop a leak proof junction between the seal, the channel and the perimeter side of the diaphragm. Moreover, the pressures involved are sufficient to cause lateral migration of the material of the diaphragm unless such migration is halted by the seal. If migration does occur, it will result in ultimate destruction of the diaphragm. From time to time, the seal will wear or become damaged and must be replaced. Such replacement requires meticulous hogging out of the damaged seal, machining a new seal to conform with the channel for the seal and the adjacent diaphragm and installing the replacement seal. The expenses and lost time attendant seal replacement are not insignificant.

SUMMARY OF THE INVENTION

A diaphragm is molded in a platen cavity of a hydroforming apparatus by a lost wax process to include a foot extending onto the rear surface of the platen cavity to use the pressure of the hydraulic fluid within the cavity to act upon the foot to effect a seal between the foot and the adjacent rear surface of the platen cavity. A seal of significantly less flexible and more hard material than the diaphragm is cast in a channel circumscribing the lateral side of the diaphragm to develop a conforming and void free junction between the seal and the channel and between the seal and the diaphragm. The cross-sectional configuration of the seal and/or the side of the diaphragm may be modified to use the lateral pressures exerted by the hydraulic fluid within the platen cavity to increase the sealing capability as a function of the hydraulic pressure applied. An alternative rectangular seal formed of four rails having overlapping ends is adhesively or mechanically secured adjacent the perimeter of the cavity prior to molding the diaphragm adjacent the seal to develop a conforming junction therebetween.

It is therefore a primary object of the present invention to provide a leak free pressurizable diaphragm disposed in a platen for use in hydroforming apparatus.

Another object of the present invention is to provide a conforming and void free junction between a diaphragm and a circumscribing seal in a platen used in a hydroforming process.

Yet another object of the present invention is to provide a self-sealing diaphragm for use in a platen of a hydroforming apparatus.

Still another object of the present invention is to provide a cast in place seal for a diaphragm in a hydroforming platen, A further object of the present invention is to provide a relatively inexpensive diaphragm and seal for a platen of a hydroforming apparatus, A yet further object of the present invention is to provide a cast seal for circumscribing a diaphragm in a platen of a hydroforming apparatus, A still further object of the present invention is to provide a method for sealing the diaphragm of a platen in a hydroforming apparatus, These and other objects of the present invention will become apparent to those skilled in the art as the description thereof proceeds,

BRIEF DESCRIPTION OF THE DRAWINGS

The present invention will be described with greater specificity and clarity with reference to the following drawings, in which:

FIG. 1 is a partial cross-sectional view of hydroforming apparatus embodying the present invention;

FIG. 2 is a partial cross-sectional view illustrating operation of the apparatus shown in FIG. 1;

DESCRIPTION OF THE PREFERRED EMBODIMENT

Figure 3:
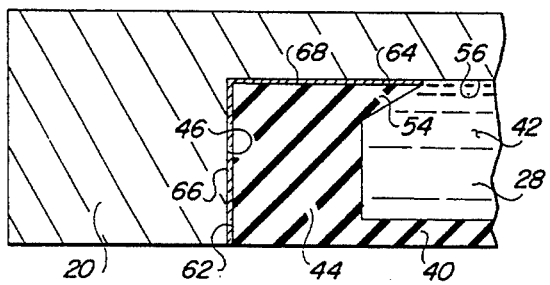
FIGS. 3 to 9 illustrate partial cross-sectional views of various mating configurations of the diaphragm and seal usable in the platen of a hydroforming apparatus.

Referring to FIG. 1, there is shown a partial view of a hydroforming apparatus used to contour or form sheet material in conformance with a die or mold. Typically, the formed sheet materials are used in applications such as keypad faces for various devices, faces of automotive instrument panels, electronic devices and instruments and the like. The sheet material is generally preprinted or precolored and is intended to be ready for use after formation of the contours, as dictated by the mold. It is therefore imperative that the sheet material be maintained clean and without contamination by hydraulic oil, other fluids or dirt. In contradistinction, in typical metal forming or metal drawing processes leakage of hydraulic fluid with accompanying contamination by the hydraulic fluid is the norm and unimportant as further processes, including cleaning, are to be performed upon the article.

FIG. 1 illustrates a partial view of a first variant of the present invention and pertinent components of a hydroforming apparatus. A rigidly mounted robust table 10 supports a die or mold 12 defining the contours to be formed in a sheet 14 of plastic hydroformable material. A platen 20 is translatable toward and away from table 10 to permit replacement of mold 12 and insertion and removal of sheets 14. Apparatus for such translation of the platen is not illustrated as it is well known to those skilled in the hydroforming process. Platen 20 includes a platen cavity 22 extending inwardly from face 24 of the platen. This cavity is interconnected with a pump 26 for pumping hydraulic fluid 28 from a reservoir 30. Valve means (not shown) are present for accommodating flow from pump 26 through conduit 32 and passageway 34 into and out of cavity 22. A diaphragm 40 extends across the opening of cavity 22 and defines, in combination with the cavity, a pressurizable compartment 42. The diaphragm is of resilient flexible material to accommodate stretchability and elongation without tearing in conformance with the contours of mold 12. The force necessary for urging diaphragm 40 into compliance with the contour of mold 12 is provided by hydraulic fluid 28 under pressure within compartment 42.

The pressure within compartment 42 may range from a few hundred psi to more than 10,000 psi. At the higher range of pressures, there is great likelihood of oil seepage from compartment 42 between side wall 44 of the diaphragm and side wall 46 of cavity 22 and on to table 10, mold 12 and/or sheet 14. Such seepage, if present, would contaminate formed sheet 14 and require subsequent cleaning of the sheet; since the costs for forming each sheet are relatively modest, the additional costs associated with subsequent cleaning of the sheets would create an unacceptable manufacturing cost increase. Furthermore, certain of the types of sheets are not meant to be cleaned or may not be contaminated due to an immediate subsequent manufacturing operation.

To seal the perimeter of diaphragm 40 within cavity 22 and to prevent migration of the diaphragm, a sealing member 48 is disposed within a channel 50 surrounding cavity 22 and diaphragm 40 disposed therein. The material of sealing member 48 is of harder and less compressible material than that of diaphragm 40. Interface 52 between sealing member 48 and side wall 44 of diaphragm 40 is mutually conforming to eliminate any voids or passageways therethrough. Such effective seal is formed primarily by casting sealing member 48 in channel 50 after diaphragm 40 and its side wall 44 has been poured and formed by a lost wax process, as is well known in the hydroforming art.

In operation, the pressure within compartment 42 acting laterally against side wall 44 forces the material of the side wall into absolute conformance with the opposing wall of the sealing member at interface 52 and against side wall 46 of cavity 22. Thereby, any seepage of oil or other hydraulic fluid intermediate side wall 46 of cavity 22 and side wall 44 of the diaphragm and between the side wall of the diaphragm and the sealing member is precluded. Flow of hydraulic fluid intermediate sealing member 48 and the surface of channel 50 is eliminated by conforming the facing surfaces of the sealing member with the surfaces of the channel through casting the sealing member in the channel.

To minimize flow of hydraulic fluid intermediate wall 46 of cavity 22 and side wall 44 of diaphragm 40, a foot 54 extends inwardly from and in inscribing relationship with side wall 44. The pressure within compartment 42 will bear against the interiorly exposed surface of foot 54 to urge the foot against the rear surface or wall 56 of cavity 22. Any perturbations or discontinuities in wall 56 adjacent the foot will be filled by the material of the foot during the pouring and formation of diaphragm 40 to minimize existence of any voids or channels at the junction therebetween. As a further precaution, an adhesive, mastic or chemical surface preparation may be employed to secure foot 54 to wall 56.

Referring to FIG. 2, there is shown the reconfiguration of diaphragm 40 during formation or contouring of sheet 14 in conformance with mold 12. In operation, table 10 is raised, as depicted by arrow 60, until face 24 of the platen is adjacent surface 16 of table 10. In this position, sealing member 48, extending about diaphragm 40, is forced into contact with surface 16 of table 10 to urge a degree of compression of the sealing member. Similarly, the peripheral portion of face 41 of diaphragm 40 outwardly of sheet 14 and mold 12 will bear against surface 16 of table 10. Initially, the pressure within compartment 42 is at ambient pressure to permit diaphragm 40 to be forced inwardly into compartment 42 in general conformance with sheet 14 and mold 12.

After table 10 has been raised and bears against platen 20, pump 26 is actuated to force hydraulic fluid 28 into compartment 42 through passageway 34. The pressure within compartment 42 will increase to a predetermined value, usually somewhere between a few thousand psi to possibly greater than 10,000 psi. The resulting pressure rise will cause diaphragm 40 to elongate and stretch into a shape which is the female/male counterpart of mold 20. Simultaneously, sheet 14 will be forced to stretch, bend and elongate until it is fully conforming with the mold, as depicted in FIG. 2. This shape will become its permanent shape (except for spring back). On completion of the hydroforming process, the pressure within cavity 42 is relieved and table 10 is lowered to permit removal of formed sheet 14. Because of the seals provided attendant diaphragm 40, sheet 14 will not have become contaminated by any leaking hydraulic fluid used to pressure form the diaphragm.

Various configurations of the perimeter edge of the diaphragm may be employed, depending upon various factors of the diaphragm material, such as hardness, resilience, elongation without tearing, and flexibility. Moreover, different operating pressure ranges, in combination with the type of material for the diaphragm necessary to conform with the characteristics of the material to be formed, and the contours of the mold are further variables that may dictate the configuration of sealing member 48 and side wall 44.

FIGS. 3 through 9 depict various configurations for the side wall of the diaphragm and the circumscribing or annular sealing member associated therewith and formed in the platen. In FIG. 3, diaphragm 40 includes a relatively thick side wall 44 having a foot 54 extending inwardly from the inner perimeter of the side wall. Preferably, the foot is tapered laterally inwardly, as illustrated. The side forces acting upon side wall 44 as a result of the pressure exerted by hydraulic fluid 28 in compartment 42 urges outer surface 62 of the diaphragm side wall against wall 46 of platen cavity 22. Similar forces acting upon foot 54 urge surface 64 of the foot against wall 56 of cavity 22. Accordingly, surfaces 62 and 64 are compressed against the adjacent surfaces and form a seal therewith. To enhance the sealed engagement of side wall 44 with the adjacent surfaces of cavity 22, mastic, adhesive or chemical surface preparation 66,68 may be applied to either or both of surfaces 46,56 to adhere the side wall to the platen cavity. The hydraulic forces for effecting a seal, with or without the adhesive, will preclude flow or migration of hydraulic fluid 28 from within compartment 42 and between the diaphragm and the platen.

Figure 4:
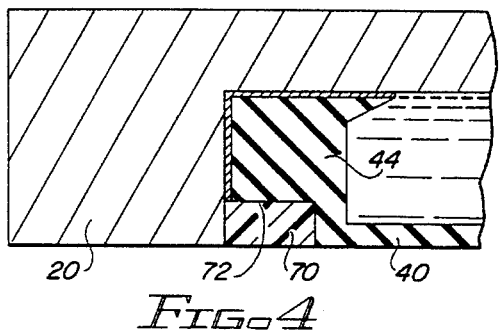

FIG. 4 illustrates a configuration similar to that shown in FIG. 3 but with the addition of a sealing member 70 disposed in a channel 72 formed in side wall 44 of diaphragm 40. Sealing member 70, extending about the perimeter of the diaphragm, is cast in place in channel 72 to perfectly conform with the surfaces of the channel formed by side wall 44 and surface 46 of platen 20.

It has been learned that sometimes material of diaphragm 40 may migrate between surface 24 of platen 20 and surface 16 of table 10 due to the difficultly of having a void free interface between these two metallic surfaces. Such migration will ultimately cause the diaphragm to deteriorate and shorten its life. By incorporating sealing member 70, diaphragm 40 is not disposed at the junction between surface 24 of platen 20 and surface 16 of table 10. Since the sealing member is of substance more hard and much less likely to migrate into any voids between the platen and the table, deterioration of sealing member from this cause is essentially eliminated. Furthermore, sealing member 70 is forced against surface 16 of table 10 and is of sufficient flexibility and resilience to establish an essentially void free junction therebetween. Accordingly, sealing member 70 will preclude migration of any material from diaphragm 40 intermediate the sealing member and surface 16 of table 10. Furthermore, the compressive interface and void free junction between the sealing member and side wall 44 of the diaphragm will prevent hydraulic oil seepage therebetween.

Figure 5:
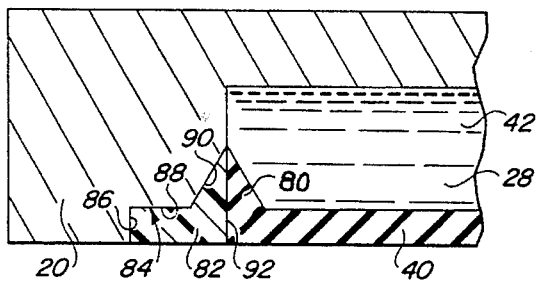

Diaphragm 40 having a tapered side wall 80 is illustrated in FIG. 5. A sealing member 82 is cast within channel 84 of platen 20, which channel includes a side wall 86, a shoulder 88 and a tapered wall 90. Casting of sealing member 82 within channel 84 precludes voids and any interstices intermediate the sealing member and platen 20 an between the sealing member and tapered sidewall 80. The forces created by hydraulic fluid 28 under pressure within compartment 42 urge tapered side wall 80 of diaphragm 40 into conforming engagement with side 92 of the sealing member to prevent flow of hydraulic fluid between the diaphragm and the sealing member. Furthermore, the sealing member, upon placement of platen 20 adjacent table 10, will prevent migration of material of diaphragm 40 laterally outwardly along surface 16 of table 10.

Figure 6:
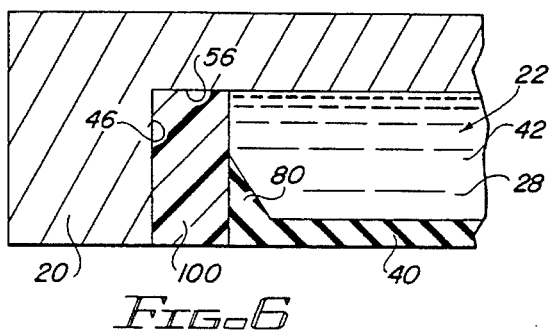

FIG. 6 illustrates a diaphragm 40 similar to that shown in FIG. 5 and a sealing member 100 essentially rectangular in cross-section. The sealing member may be cast in place either before or after formation of diaphragm 40. Because sealing member 100 is cast, it will form a sealing engagement with walls 46 and 56 of cavity 22. Moreover, whether the sealing member or the diaphragm is cast first, a sealing engagement therebetween will result. As discussed above, foot 80 of the diaphragm is urged by the hydraulic forces into sealing engagement with the sealing member. Moreover, the sealing member will preclude lateral migration of material of the diaphragm upon application of hydraulic pressure within cavity 42.

Figure 7:
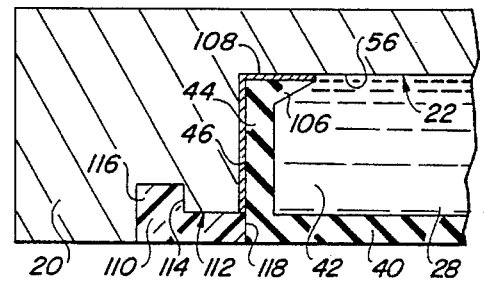

FIG. 7, along with FIGS. 1 and 2, illustrate a diaphragm 40 having a relatively thin side wall 44 terminated adjacent wall 56 of cavity 22 by a laterally tapered foot 106 extending into compartment 42 (similar to that shown in FIGS. 1 and 2). An adhesive 108 may be used to secure side wall 44 and tapered foot 106 to surfaces 46 and 56, respectively. Alternatively, the adhesive may be omitted. After formation of diaphragm 40, a sealing member 110 is cast into a channel 112 surrounding the perimeter of the diaphragm. This channel may include a step 114 to establish a foot segment 116 for the sealing member. The forces urged by hydraulic fluid 28 under pressure within compartment 42 will urge tapered foot 106 against surface 56. The same hydraulic forces will urge side wall 44 against wall 46 of cavity 22. Moreover, these hydraulic forces will also urge diaphragm 40 against the adjacent edge 118 of the sealing member. Because sealing member 110 is cast, edge 118 will exactly conform with the adjacent surface of side wall 44 of the diaphragm. Alternatively, if the sealing member is cast first, the corresponding surface of side wall 44 of the diaphragm will conform with the surface configuration of edge 118 to establish a seal therebetween. As discussed above, sealing member 110 will preclude lateral migration of material from diaphragm 40 between platen 20 and table 10 upon application of hydraulic pressure within compartment 42.

Figure 8:
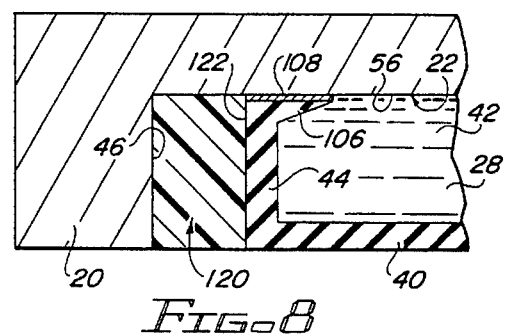

FIG. 8 illustrates a diaphragm 40 having a side wall and a foot structure similar to that described above. An adhesive or chemical surface preparation 108 may be used to adhere foot 106 to surface 56 of cavity 22. Sealing member 120 is cast peripherally about diaphragm 40 as essentially rectangular in cross-section. Because the sealing member is cast and of relatively hard material, it will form a seal with adjacent surfaces 46 and 56 of cavity 22 to prevent flow of hydraulic fluid therebetween. The substantial area of surface 122 of side wall 44 adjacent sealing member 120 will provide a very effective seal therebetween to prevent flow of hydraulic fluid through the junction upon an increase of pressure within compartment 42. Moreover, the sealing member will prevent lateral migration of material from diaphragm 40 between surface 24 of platen 20 and surface 16 of table 10.

Figure 9:
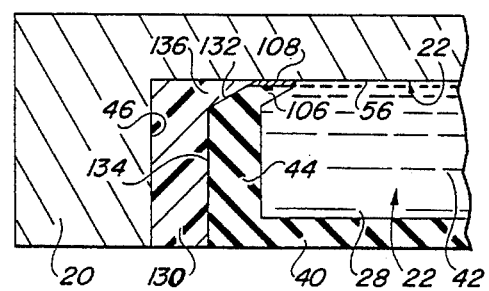

FIG. 9 illustrates a yet further configuration of side wall 44 of diaphragm 40 and sealing member 130. Side wall 44 includes a laterally tapered foot 106 which may be adhesively adhered to wall 56 of cavity 22 by adhesive or chemical surface preparation 108. Side wall 44 includes an undercut 132 extending from outer surface 134. Sealing member 130 is cast to fill the space between undercut 132 and wall 56 as well as the space between the surface 134 and wall 46 of cavity 22. It may be noted that either diaphragm 40 or sealing member 130 may be cast first. As described above, the hydraulic pressure within compartment 42 will urge foot 106 into sealing engagement with wall 56. The hydraulic pressure, acting through side wall 44, will exert a pressure upon foot 136 of sealing member 130 to urge the foot against wall 56 and effect a sealing engagement therewith. Because both the diaphragm and the sealing member are cast, the junction therebetween will be without voids or passages. The pressure acting against side wall 44 will urge surface 134 adjacent the corresponding surface of sealing member 130 to effect a seal therebetween to preclude flow of hydraulic fluid therethrough. As discussed above, the sealing member will also preclude migration of material of the diaphragm laterally and between the sealing member and surface 16 of table 20.

It is preferable that diaphragm 40 be made from an elastomeric material, such as polyurethane. The hardness of the diaphragm is in the range of 55 to 90 durometer Shore A. This range will allow for hard and relatively soft diaphragm materials to be used to achieve different forming characteristics with different sheet materials and molds. The harder materials are less resilient and cause better forming with thicker plastic sheet and thin wall metal products.

However, the softer diaphragm materials allow for better stretchability and elongation without tearing when the mold requires deep draws and complex form shapes. It may be noted that material outside the range of 55–90 Shore A may be used but this range is typical for most applications. A representative material having a hardness of 65 durometer Shore A is available from a company known as Ciba-Geigy; it has a product number of RP-6401 for both the resin and hardener.

The sealing member is made from an elastomeric compound. To obtain perfect pressure seals between the diaphragm and the platen, a castable (catalytic) polymer or epoxy compound is used. This material, in liquid state, will flow into the recessed sealing areas between a previously cast diaphragm and the walls of the channel in the platen. Upon setup, the material assumes a rigid or semi-rigid state and provides adequate adhesion between both the side wall of the diaphragm and the sealing member and between the side wall of the channel in the platen and the sealing member. The sealing member may be cast prior to the diaphragm by using a dam to represent the diaphragm during casting.

The sealing member is made from higher durometer material than the diaphragm. Typically, the range will be 90 to 95 durometer Shore A and 60 to 90 durometer Shore D. Experience dictates that the best results are achieved if there is a minimum of 20 points of durometer difference between the material of the sealing member and the material of the diaphragm. This will accommodate stretch and compression of the diaphragm material against the sealing member under pressure and the sealing member will not compress to like amount; it will therefore create a compression seal. Material suitable for the cast sealing member is a product obtainable from the Ciba-Geigy company known under the product designation RP-6405 polyurethane 70 Shore D (castable); other polyurethane compounds such as TDT-178-59-1 polyurethane 88 Shore D (castable) are also suitable as well as compounds of an epoxy type. By casting the sealing member, the sealing member will be seamless and bond itself to the adjacent surfaces. The resulting dimensional fit is far more perfect than any achieved by machined sealing members, as have been used previously.

As described above, the foot extending from the side wall of the diaphragm extends inwardly around the entire interior wall of the side wall of the diaphragm. This foot is cast in place during casting of the diaphragm. Preferably, surface 56 of cavity 22 in platen 20 is first coated with a chromate primer to facilitate adhesion of the foot to the metallic surface (56) upon application of an adhesive. The forces acting upon the foot during an increase in hydraulic pressure in compartment 42 urges the foot both against surface 56 of the cavity and also laterally outwardly. Such lateral outward movement causes a compressive seal to be formed with the corresponding part of either the side wall of the cavity or the adjacent surface of the sealing member, depending upon the configuration of the sealing member.

Figure 10:
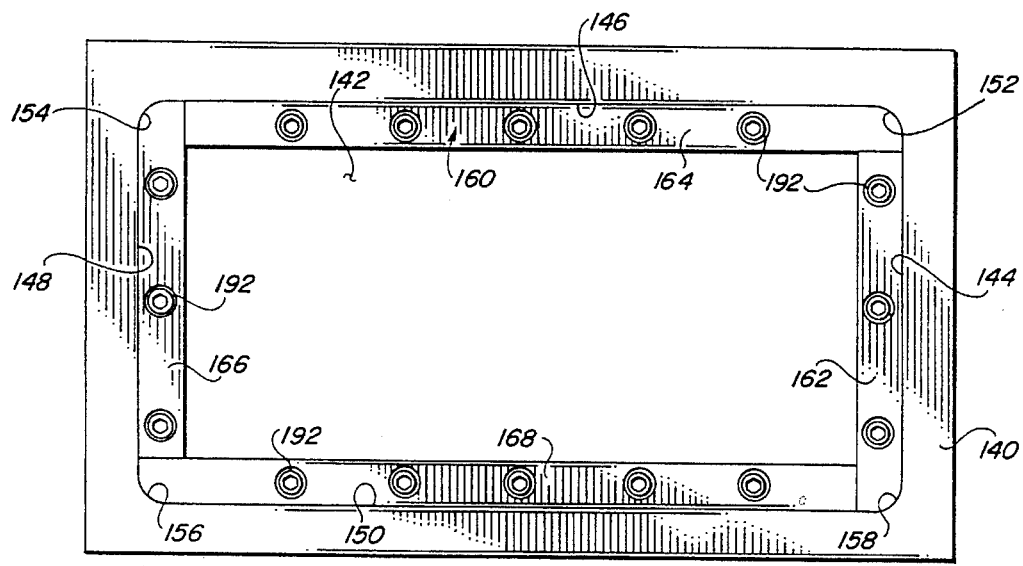
FIG. 10 is a bottom view of a platen having a diaphragm circumscribed by four rails of a seal.
Figure 11:
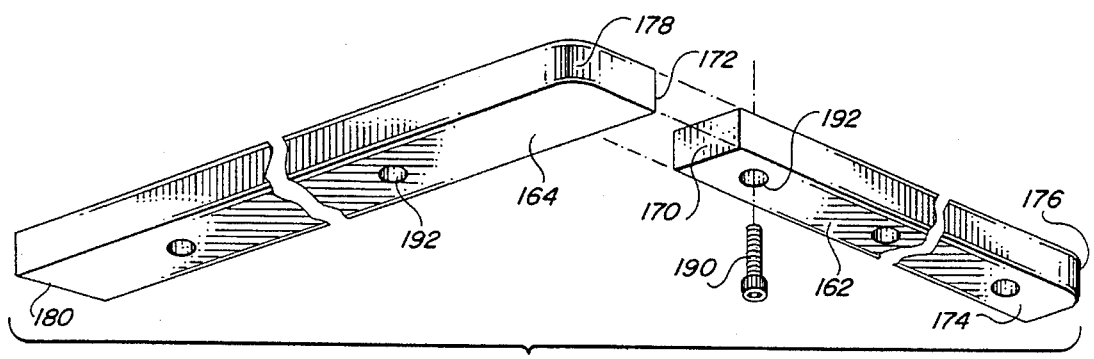
FIG. 11 is a partial isometric view of the seal shown in FIG. 10.

Referring to FIG. 10, there is shown a bottom view of a platen 140, which platen is similar to platen 20 illustrated in FIGS. 1 and 2. A cavity 142 is formed therein, which cavity may be rectangular and defined by interior side walls 144, 146, 148 and 150. Preferably, the junction between adjacent side walls is defined by a 90° rounded corner, such as corners 152, 154, 156 and 158. A seal 160 is formed in the platen in circumscribing relationship with a diaphragm lodged within cavity 142 by rails 162, 164, 166 and 168. Each rail includes a squared off end abutting a side wall of an adjacent rail and a rounded end mating with the corresponding corner of the intersecting side walls. As particularly shown in FIG. 11, rail 162 includes squared off end 170 abutting side 172 of rail 164. End 174 of rail 162 includes a rounded corner 176 configured to mate with corner 158 of cavity 142. Similarly, rail 164 includes rounded corner 178 to mate with corner 152 of the cavity. Squared off end 180 of rail 164 abuts the side of rail 166. Other configurations of the ends of the rails may be employed.

Rails 162, 164, 166 and 168 may be retained in place within cavity 84 adjacent the corresponding side walls by an adhesive or mastic. Alternatively, retention may be provided by a plurality of bolts 190 extending through corresponding hole 192 in each of the rails. Each of these bolts threadedly engage threaded cavities in platen 160. The use of such bolts permit relatively facile removal and replacement of the rails upon damage or wear. Moreover, the use of bolts permits exertion of sufficient force of each of the rails against the corresponding surface of cavity 142 in platen 160 to provide an effective seal against migration of hydraulic fluid therebetween. Accordingly, the number of bolts to be use is a function of the degree of rigidity of the rails as well as a function of the pressure exerted by the hydraulic fluid disposed within the diaphragm.

Figure 12:
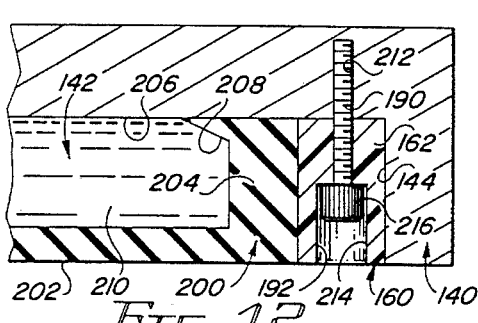
FIG. 12 is a partial cross sectional view of the seal, diaphragm and platen shown in FIG. 10.

Referring to FIG. 12, there is shown a partial cross-sectional view illustrating the relationship between a diaphragm 200, which diaphragm may be of the type described above and identified by reference numeral 40. That is, it includes a face 202, a side wall 204, extending to surface 206 of cavity 142. The end of the side wall may include an interiorly extending foot 208. The space defined by face 202, side wall 204 and cavity 142 is filled with hydraulic fluid 210, which hydraulic fluid may be placed under pressure to perform the hydroforming operation, as described above. Seal 160, such as rail 162 depicted is generally rectangular in cross-section having a width commensurate with side wall 144 of platen 140. The thickness of the rail is variable as a function of the material of the rail, the pressures anticipated and the structural requirements attendant seating and tightening of bolt 190. The bolt extends through hole or passageway 192 into threaded engagement with threaded cavity 212 in platen 140. As illustrated, passageway 192 may include a countersunk section 214 to accommodate locating bolt head 216 at a distance from the bottom of the platen. Thus, neither the bolt nor the bolt head will impede the sealing function performed by seal 160.

In operation, rails 162, 164, 166 and 168 are machined or otherwise formed to be located in abutting or overlapping relationship with one another along and within the perimeter of cavity 142 in platen 140, as illustrated in FIG. 10. After securing the rails in place, such as with bolts 190, diaphragm 200 is cast in place, such as by the lost wax process, as described above. Such casting will cause the diaphragm to perfectly conform with the adjacent contacted surfaces of the circumscribing rails. Thereby, essentially absolute conformance therebetween is obtained and the presence of any passageways or open interstices through with hydraulic oil under pressure may flow are essentially precluded.

Figure 13:
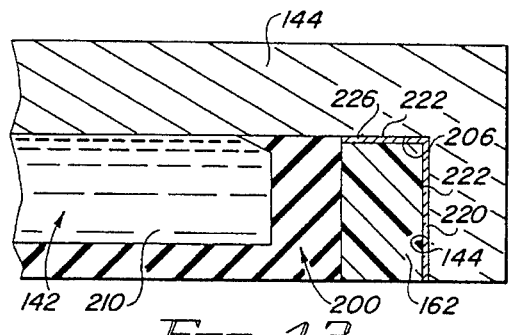
FIG. 13 is a further partial cross-sectional view of the seal, diaphragm and platen shown in FIG. 10.

Referring to FIG. 13, there is shown a variant of the means for attaching each of the rails. Instead of using a threaded bolt 190, mastic, adhesive or chemical surface preparation 220 may be placed intermediate side wall 222 of rail 162 and side wall 144 of platen 140. A mastic or adhesive 222, which may be the same as mastic 220, may be placed intermediate bottom wall 226 of rail 162 and bottom surface 206 of cavity 142. Thereby, rail 162 may be adhered to the perimeter wall and corresponding bottom surface of cavity 142 and platen 140.

To remove and replace seal 160, each of the rails may be disengaged from platen 140 by unscrewing bolts 190, is used. In the event a mastic or adhesive is employed to secure the rails, the bonding effect of the adhesive may be nullified chemically or mechanical means may be used to remove the rails. Prior to replacement, the corresponding side wall and bottom surface of cavity 142 in platen 140 would have to be smoothed by cleaning or other means to ensure a tight fit with the replacement rails.

While the principles of the invention have now been made clear in an illustrative embodiment, there will be immediately obvious to those skilled in the art many modifications of structure, arrangement, proportions, elements, materials and components used in the practice of the invention which are particularly adapted for specific environments and operating requirements without departing from those principles.

We claim:

1. Apparatus for hydroforming sheet material in conformance with a mold having contours, said apparatus comprising in combination:
   a) a platen having a cavity formed therein adjacent a face of said platen, said cavity including a bottom surface and a circumscribing sidewall;
   b) means for pumping hydraulic fluid into said cavity;
   c) a table for supporting the mold and the sheet material placed upon the mold:
   d) a diaphragm at least partially located in and extending into said cavity for containing the hydraulic fluid in said cavity, said diaphragm being flexibly responsive to the hydraulic fluid pumped into said cavity and into contact with said diaphragm to develop a pressure within said cavity to cause said diaphragm to form the sheet material in conformance with the contours of the mold;
   e) means for sealing said diaphragm with said cavity to prevent seepage of hydraulic fluid intermediate said diaphragm and said circumscribing sidewall of said cavity; and
   f) said sealing means including a sealing member circumscribing said diaphragm, said sealing member comprising a plurality of rails disposed within said cavity adjacent said circumscribing sidewall of said cavity and conforming with the adjacent surfaces of said cavity and said circumscribing sidewall of said diaphragm.

2. The apparatus as set forth in claim 1 including means for adhering said rails to said platen.

3. The apparatus as set forth in claim 1 including means for attaching said rails to said platen.

4. The apparatus as set forth in claim 1 wherein each rail of said plurality of rails abuts the ends of adjacent ones of said plurality of rails.

5. Apparatus for hydroforming sheet material in conformance with a mold having contours, said apparatus comprising in combination:
   a) a platen having a cavity formed therein adjacent a face of said platen, said cavity including a bottom surface and a circumscribing sidewall;
   b) means for pumping hydraulic fluid into said cavity;
   c) a table for supporting the mold and the sheet material placed upon the mold;
   d) a diaphragm located in and extending at least partially across said cavity and having a circumscribing sidewall extending into said cavity for containing the hydraulic fluid in said cavity, said diaphragm being flexibly responsive to the hydraulic fluid pumped into said cavity in contact with said diaphragm to develop a pressure within said cavity to cause said diaphragm to conform with the contours of the mold and to form the sheet material in conformance with the contours of the mold;
   e) a rail disposed within the cavity for circumscribing and sealing said diaphragm with said cavity to prevent seepage of hydraulic fluid intermediate said diaphragm and said circumscribing sidewall of said cavity and to prevent migration of said diaphragm to a location intermediate the face of said platen and said table; and
   f) said rail including i) a first surface and a second surface circumscribing said diaphragm, said first surface conforming with the adjacent surface of said cavity and said second surface conforming with the adjacent surface of said circumscribing sidewall of said diaphragm, and ii) a foot of said diaphragm extending inwardly from said circumscribing sidewall of said diaphragm along a segment of said bottom surface of said cavity, a surface of said foot facing said cavity being exposed to the hydraulic fluid within said cavity to urge said foot into sealing contact with said rail and the adjacent segment of said bottom surface.

6. The apparatus as set forth in claim 5 wherein said foot is tapered laterally into said cavity.

7. The apparatus as set forth in claim 5 including an adhesive for adhering said sidewall of said diaphragm said sidewall of said cavity.

8. The apparatus as set forth in claim 5 including an adhesive for adhering said foot with said bottom surface of said cavity.

9. The apparatus as set forth in claim 5 wherein said rail is of greater hardness on a durometer Shore A scale than the hardness of said diaphragm to prevent migration of said diaphragm intermediate said platen and said table.

10. The apparatus as set forth in claim 5 including means for dynamically sealing said sidewall of said diaphragm with said sidewall of said cavity upon application of hydraulic pressure within said cavity.

11. Apparatus for forming sheet material in conformance with a mold having contours, said apparatus comprising in combination:
   a) a platen having a cavity formed therein adjacent a face of said platen, said cavity including a circumscribing sidewall;
   b) a pump for pumping a fluid into said cavity;
   c) a table for supporting the mold and the sheet material placed upon the mold;
   d) a diaphragm located in and extending across said cavity and having a circumscribing sidewall extending into said cavity for containing the fluid in the space defined by said cavity and said diaphragm, said diaphragm being flexibly responsive to the fluid pumped into said cavity in contact with said diaphragm and to the pressure developed by the fluid in said cavity to urge said diaphragm adjacent the sheet material and cause the sheet material to conform with the contours of the mold;
   e) a channel circumscribing said cavity and defining a lateral extension of said cavity; and
   f) a rail disposed in said channel for developing a seal between the face of said platen and said table and to prevent lateral migration of said diaphragm from within said cavity to a location intermediate the face of said platen and said table.

12. Apparatus for forming sheet material in conformance with a mold having contours, said apparatus comprising in combination:

a) a platen having a cavity formed therein adjacent a face of said platen, said cavity including a circumscribing sidewall;

b) a pump for pumping a fluid into said cavity;

c) a table for supporting the mold and the sheet material placed upon the mold;

d) a diaphragm located in and extending at least partially across said cavity and having a circumscribing sidewall extending into said cavity for containing the fluid in the space defined by said cavity and said diaphragm, said diaphragm being flexibly responsive to the fluid pumped into said cavity and in contact with said diaphragm and to the pressure developed by the fluid in said cavity to urge said diaphragm adjacent the sheet material and to cause the sheet material to conform with the contours of the mold; and e) a rail disposed in said cavity intermediate the circumscribing sidewall of said cavity and the circumscribing sidewall of said diaphragm for developing a seal between the face of said platen and said table and to prevent lateral migration of said diaphragm from within said cavity to a location intermediate the face of said platen and said table.

* * * * *